US008920573B2

(12) United States Patent
Chang et al.

(10) Patent No.: US 8,920,573 B2
(45) Date of Patent: Dec. 30, 2014

(54) METHOD OF IMPROVING PURITY AND YIELD OF CHEMICAL PRODUCT IN AUTOMATIC RADIOACTIVE MEDICINE SYNTHESIS SYSTEM

(75) Inventors: Chia-Jung Chang, Taoyuan County (TW); Mei-Hsiu Liao, Taoyuan County (TW); Lie-Hang Shen, Taoyuan County (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 673 days.

(21) Appl. No.: 13/232,920

(22) Filed: Sep. 14, 2011

(65) Prior Publication Data

US 2013/0061881 A1 Mar. 14, 2013

(51) Int. Cl.
*B08B 3/04* (2006.01)
*B01D 11/04* (2006.01)
*B08B 9/027* (2006.01)

(52) U.S. Cl.
CPC .................................... *B08B 9/027* (2013.01)
USPC ................ 134/10; 134/11; 134/22.1; 134/26; 134/31; 210/634; 210/636; 210/661

(58) Field of Classification Search
USPC ......... 134/22.1, 22.18, 10, 11, 42, 26, 31, 37; 210/634, 636, 661
See application file for complete search history.

(56) References Cited

U.S. PATENT DOCUMENTS

2006/0130649 A1* 6/2006 Jain et al. .......................... 95/82
2011/0105770 A1* 5/2011 Liu et al. ....................... 549/490

* cited by examiner

*Primary Examiner* — Saeed T Chaudhry
(74) *Attorney, Agent, or Firm* — Jackson IPG PLLC

(57) ABSTRACT

The present invention increases a number of target reaction containers from one into many. Coordinated with increased reaction times, total reaction volume is increased. By modifying an affinitive column of an automatic synthesis system, a production in a single batch is increased. The products obtained can be conformed to quality check specifications with cost saved.

3 Claims, 7 Drawing Sheets

METHOD OF IMPROVING PURITY AND YIELD OF CHEMICAL PRODUCT IN AUTOMATIC RADIOACTIVE MEDICINE SYNTHESIS SYSTEM

TECHNICAL FIELD OF THE INVENTION

The present invention relates to a radioactive medicine synthesis system; more particularly, relates to improving purity and yield of chemical product in an automatic radioactive medicine synthesis system.

DESCRIPTION OF THE RELATED ARTS

Nuclear medicine uses affinitive column for adhesion of target medicine to obtain product after washing and eluting. However, iodine isotope would process radioiodination in a buffer containing an oxidant. Hence, yield of target and purity of radioactive chemical medicine are affected by the volume of solution; time for oxidation; and arrangement of adhesion, washing and eluting processes. Thus, the yield and purity may become bad with high cost and the product obtained may become useless. For increasing production, the source has to be increased. But, following the increase in source, its volume is increased too. As a result, the yield and purity are still not increased or even decreased.

A prior art separates the adhesion process and the washing process to reduce pollution of impurities. To avoid operators being seriously polluted by the radioactive source during the processes, the prior art is automated. The operators only have to take the column manually for washing at the final stage. However, the activity of the column may be still high, the pollution may happen to the operators or there may be a chance for operation mistake in the time before washing.

Another prior art, Automated system for formulating radiopharmaceuticals, automates the purification of isotope washed from a germanium (Ge)/gallium (Ga) generator. The product obtained from the generator is a water solution and is not radioactively synthesized. It does not have buffer tubes having different sizes; have simple adhesion and washing processes; and detects purity of nuclei instead of purity of radioactive chemical medicine.

In theory, the easiest way for increasing the chemical production is to increase the volume of the reactants. But, in fact, it is not so simple. For example, the total volume for the reactions is critical. The reaction of radioiodination is processed in a liquid state and some reaction solutions can not be condensed, so that the yield may not be increased following the increase of the total reaction volume. Besides, radioiodination may contains some incomplete reactions so that some unreacted iodine will be left over. Purification has to be done to the product through processes of adhesion (of the product), washing and elution with an affinitive column, where the adhesion process includes processes of repeated back-and-forth flowing through the column to increase efficiency of adhesion. However, the reaction solution filled in the column has a volume smaller than the total reaction volume, some problems may occur in the automatic system, even though an adhesion batch may be designed in theory. Because the column has a small diameter and the liquid has surface tension, incomplete adhesion may happen during the repeated flowing processes and some waste solution may be generated and discharged.

Hence, the prior arts do not fulfill all users' requests on actual use.

SUMMARY OF THE INVENTION

The main purpose of the present invention is to increase a number of target reaction containers from one into many for increasing reaction volume coordinated with increased reaction times and, by modifying an affinitive column of an automatic synthesis system, to increase production in a single batch conformed to quality check specifications.

The main purpose of the present invention is provide an automatic way to separate adhesion process and washing process by switching electromagnetic valves coordinated with different sizes of buffer tubes for increasing production and reducing cost To achieve the above purposes, the present invention is a method of improving purity and yield of chemical product in an automatic radioactive medicine synthesis system, comprising steps of: (a) washing by: inputting a total solution of total solution by nitrogen gas to be flown through a second electromagnetic valve, a first electromagnetic valve and a fourth electromagnetic valve to enter into a first buffer tube; flowing said total solution through a sixth electromagnetic valve to enter an adhesion column to process adhesion; flowing said total solution through an eighth electromagnetic valve and a seventh electromagnetic valve to enter a second buffer tube; flowing a waste gas through a fifth electromagnetic valve and a third electromagnetic valve to be discharged; and staying said total solution in said second buffer tube; (b) backwashing by: flowing nitrogen gas through said second electromagnetic valve, said third electromagnetic valve and said fifth electromagnetic valve to push out said total solution in said second buffer tube; flowing said total solution through said seventh electromagnetic valve and said eighth electromagnetic valve to enter said adhesion column to process adhesion; flowing said total solution through said sixth electromagnetic valve to enter said first buffer tube; and flowing a waste gas through said fourth electromagnetic valve and said first electromagnetic valve to be discharged; (c) discharging reaction solution by: flowing nitrogen gas through said second electromagnetic valve, said first electromagnetic valve and said fourth electromagnetic valve to push out said total solution stayed in said first buffer tube; flowing said total solution through said sixth electromagnetic valve, said eighth electromagnetic valve and a ninth electromagnetic valve to be discharged; (d) backwashing by: flowing a cleaning fluid through said second electromagnetic valve, said third electromagnetic valve and said fifth electromagnetic valve to enter a fourth buffer tube; flowing said cleaning fluid through said seventh electromagnetic valve and said eighth electromagnetic valve to enter said adhesion column to wash out impurities; flowing said cleaning fluid through said sixth electromagnetic valve to enter a third buffer tube; and flowing said cleaning fluid through said fourth electromagnetic valve and said first electromagnetic valve to be discharged; (e) washing by: flowing a cleaning fluid through said second electromagnetic valve, said first electromagnetic valve and said fourth electromagnetic valve to enter said third buffer tube; flowing said cleaning fluid through said sixth electromagnetic valve to enter said adhesion column to wash out impurities; and flowing said cleaning fluid through said eighth electromagnetic valve and said ninth electromagnetic valve to be discharged; and (f) eluting out product by: flowing an eluting fluid through said second electromagnetic valve, said first electromagnetic valve and said fourth electromagnetic valve to enter said third buffer tube; flowing an eluting fluid through said sixth electromagnetic valve to enter said adhesion column to elute out a product; and flowing said product through said eighth electromagnetic valve and said ninth electromagnetic valve to flow out said product. Accordingly, a novel method of improving purity and yield of chemical product in an automatic radioactive medicine synthesis system is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the structural view showing the devices used in the preferred embodiment according to the present invention;

DESCRIPTION OF THE PREFERRED EMBODIMENT

The following description of the preferred embodiment is provided to understand the features and the structures of the present invention.

Figure 1:
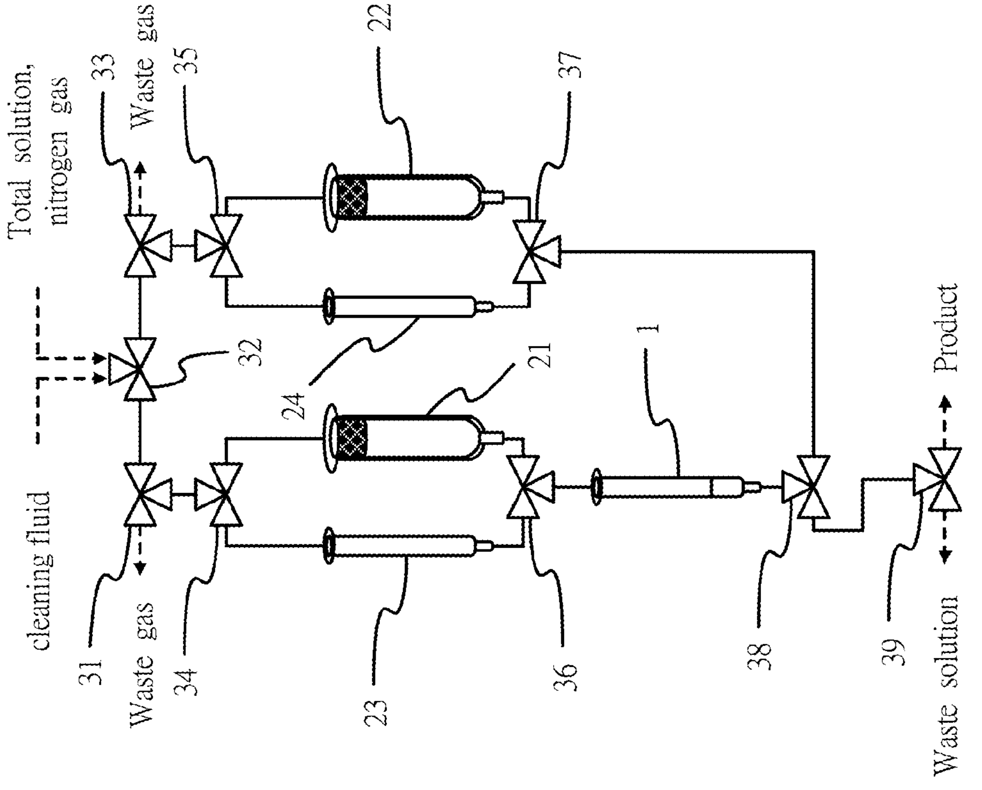

Please refer to FIG. 1, which is a structural view showing devices used in a preferred embodiment according to the present invention. As shown in the figure, the present invention is a method of improving purity and yield of chemical product in an automatic radioactive medicine synthesis system, where an original chemical reaction are divided into multiple reactions with adhesions processed after the multiple reactions; and where the adhesions have a total solution flowing back and forth along an adhesion column 1 several times for enhancing adhesion efficiency. Since the total solution has a big volume, the adhesion column 1 is separately added with a buffer tube 21,22 at each end of the adhesion column 1 for guiding the flowing of the total solution coordinated with a plurality of three-way electromagnetic valves 31~39.

For removing unreacted radioactive iodine, the column must be cleaned. In an automatic synthesis system, the present invention added two more buffer tubes 23,24 for washing and backwashing to separate processes of adhesion and washing for improving washing effect with the coordination of the three-way electromagnetic valves 31~39.

Figure 2:
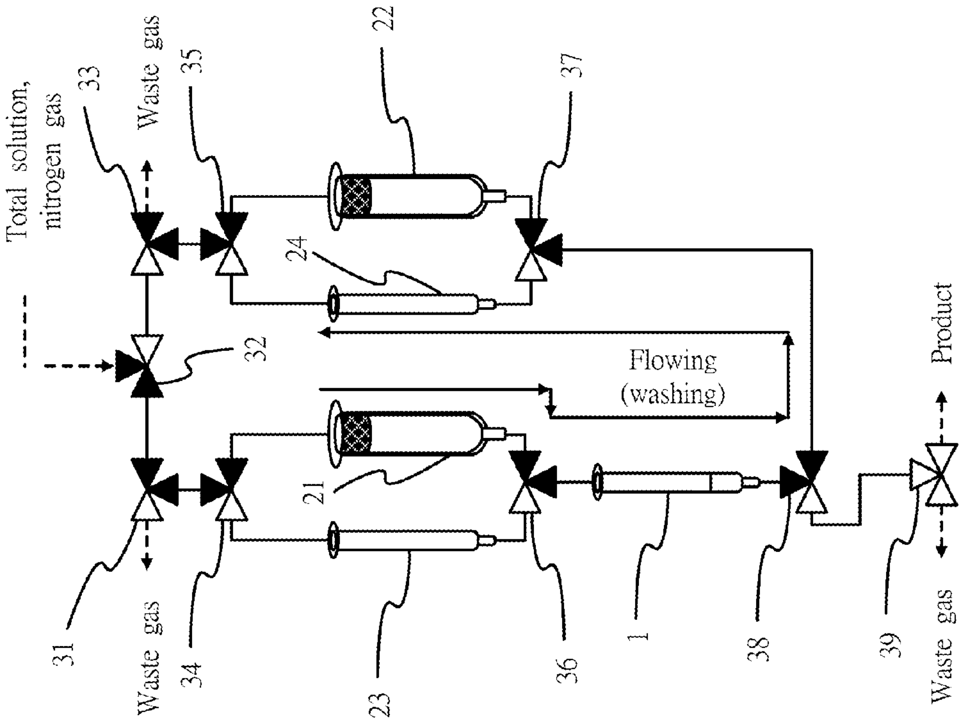
FIG. 2 is the view showing the process of washing with adhesion.

Please refer to FIG. 2 to FIG. 7, which are views showing processes of washing with adhesion, backwashing with adhesion, discharging reaction solutions, backwashing, washing and eluting out product. As shown in the figures, the present invention comprises the following steps:

(a) Washing for adhesion: A total solution of reaction solutions is flown for adhesion with column. In FIG. 2, a total solution of reaction solutions is pushed by nitrogen gas to be flown through a second electromagnetic valve 32, a first electromagnetic valve 31 and a fourth electromagnetic valve 34 to enter into a first buffer tube 21. Then, the total solution is flown through a sixth electromagnetic valve 36 to enter an adhesion column 1 to process adhesion. Then, the total solution is flown through an eighth electromagnetic valve 38 and a seventh electromagnetic valve 37 to enter a second buffer tube 22. Then, a waste gas is flown through a fifth electromagnetic valve 35 and a third electromagnetic valve 33 to be discharged. The total solution is stayed in the second buffer tube 22.

Figure 3:
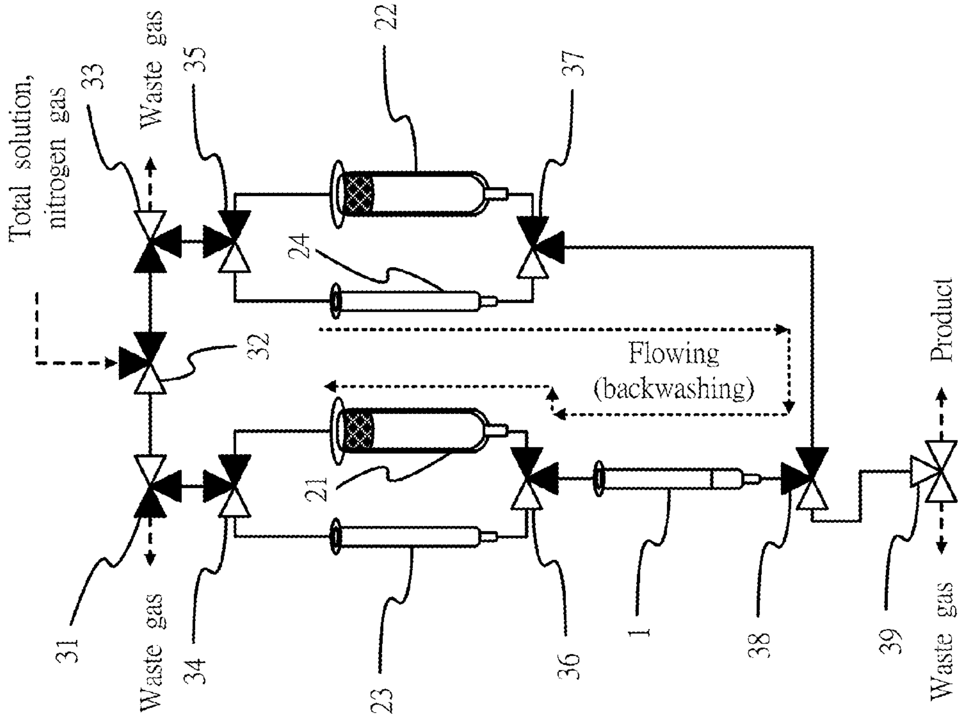
FIG. 3 is the view showing the process of backwashing with adhesion.
Figure 4:
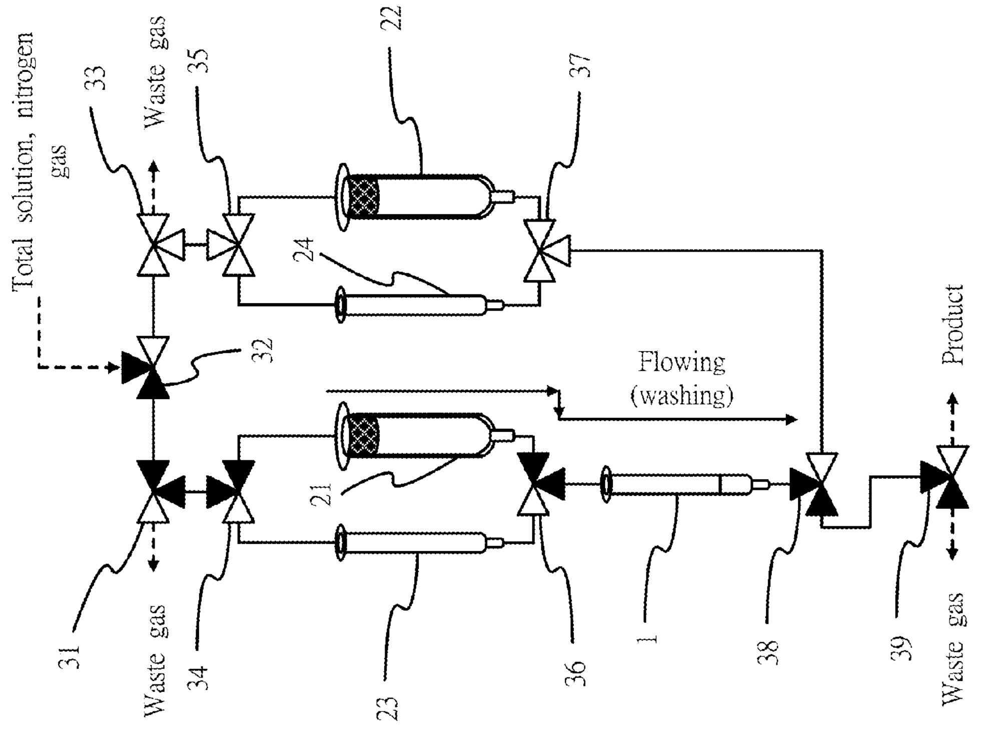
FIG. 4 is the view showing the process of discharging the total solution.
Figure 5:
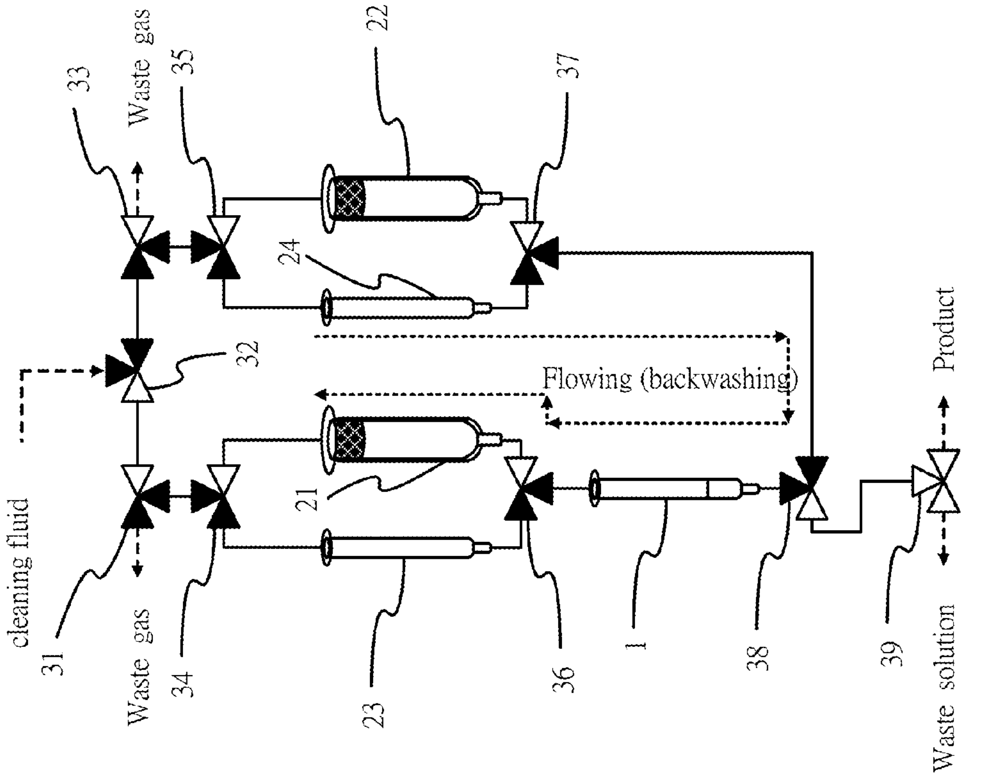
FIG. 5 is the view showing the process of backwashing.
Figure 6:
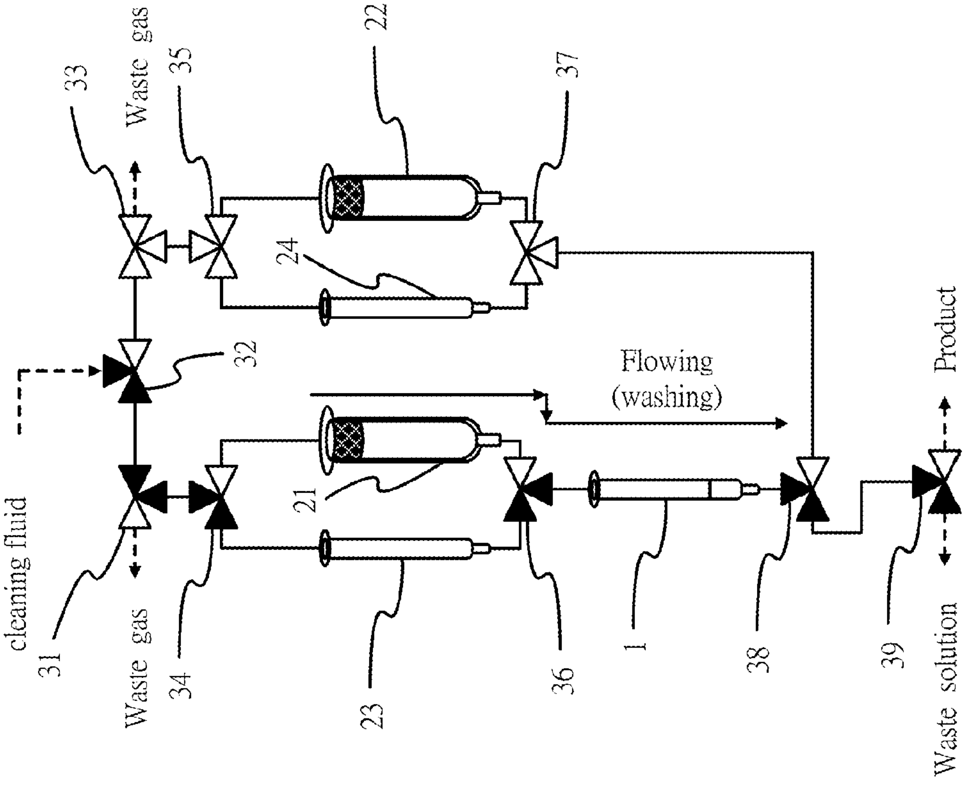
FIG. 6 is the view showing the process of washing.
Figure 7:
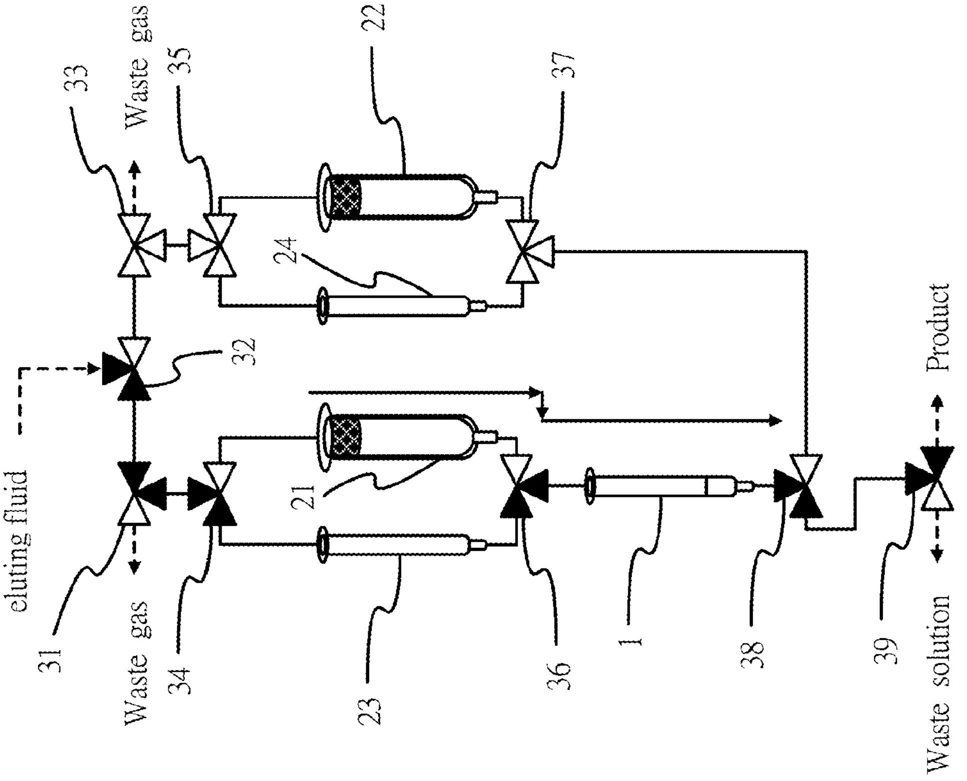
FIG. 7 is the view showing the process of eluting out product.

(b) Backwashing for adhesion: The total solution stayed in the second buffer tube 22 is flown for backwashing for adhesion with column. In FIG. 3, nitrogen gas is flown through the second electromagnetic valve 32, the third electromagnetic valve 33 and the fifth electromagnetic valve 35 to push out the total solution stayed in the second buffer tube 22. Then, the total solution is flown through the seventh electromagnetic valve 37 and the eighth electromagnetic valve 38 to enter the adhesion column 1 for processing adhesion. Then, the total solution is flown through the sixth electromagnetic valve 36 to enter the first buffer tube 21. Then, a waste gas is flown through the fourth electromagnetic valve 34 and the first electromagnetic valve 31 to be discharged.

(c) Discharging reaction solution: Nitrogen gas is flown through the second electromagnetic valve 32, the first electromagnetic valve 31 and the fourth electromagnetic valve 34 to push out the total solution stayed in the first buffer tube 21. Then, the total solution is flown through the sixth electromagnetic valve 36, the eighth electromagnetic valve 38 and a ninth electromagnetic valve 39 to be discharged.

(d) Backwashing: A cleaning fluid is flown through the second electromagnetic valve 32, the third electromagnetic valve 33 and the fifth electromagnetic valve 35 to enter a fourth buffer tube 24. Then, the cleaning fluid is flown through the seventh electromagnetic valve 37 and the eighth electromagnetic valve 38 to enter the adhesion column 1 to wash out impurities. Then, the cleaning fluid is flown through the sixth electromagnetic valve 36 to enter a third buffer tube 23. Then, the cleaning fluid is flown through the fourth electromagnetic valve 34 and the first electromagnetic valve 31 to be discharged.

(e) Washing: A cleaning fluid is flown through the second electromagnetic valve 32, the first electromagnetic valve 31 and the fourth electromagnetic valve 34 to enter the third buffer tube 23. Then, the cleaning fluid is flown through the sixth electromagnetic valve 36 to enter the adhesion column 1 for washing out impurities. Then, the cleaning fluid is flown through the eighth electromagnetic valve 38 and the ninth electromagnetic valve 39 to be discharged.

(f) Eluting: An eluting fluid is flown through the second electromagnetic valve 32, the first electromagnetic valve 31 and the fourth electromagnetic valve 34 to enter the third buffer tube 23. Then, the eluting fluid is flown through the sixth electromagnetic valve 36 to enter the adhesion column 1 for eluting out a product. Then, the product is flown through the eighth electromagnetic valve 38 and the ninth electromagnetic valve 39 to be flown out.

The first to the ninth electromagnetic valves 31~39 are three-way electromagnetic valves; and, the first and the second buffer tubes 21,22 have diameters and volumes bigger than the third and the fourth buffer tubes 23,24.

The present invention increases a number of target reaction containers from one into many (e.g. three) for increasing reaction volume coordinated with increased reaction times. An affinitive column of an automatic synthesis system is modified for increasing production in a single batch conformed to quality check specifications.

Hence, the present invention separates a chemical reaction into many reactions for repeatedly processing original reactions to avoid reducing yield on increasing reaction volume. Besides, the present invention adds two plastic tubes at head and tail ends of the column to be used as buffer tubes for not only processing adhesion several times but also for solving the problem of incomplete adhesion for reaction solution owing to surface tension (i.e. waste solution). Furthermore, the present invention adds two empty columns at head and tail ends of the column to be used as buffer tubes to separate adhesion process and washing process with coordination of electromagnetic valves for controlling to obtain products conformed to quality check specifications.

To sum up, the present invention is a method of improving purity and yield of chemical product in an automatic radioactive medicine synthesis system, where, in an automatic way, adhesion process and washing process are separated by switching electromagnetic valves coordinated with different sizes of buffer tubes for increasing production and reducing cost.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present invention.

What is claimed is:

1. A method of improving purity and yield of chemical product in an automatic radioactive medicine synthesis system, comprising steps of:

(a) washing by: inputting a total solution of reaction solutions sequentially pushed by nitrogen gas to be flown through a second electromagnetic valve, a first electromagnetic valve and a fourth electromagnetic valve to enter into a first buffer tube; flowing said total solution sequentially pushed by nitrogen gas through a sixth electromagnetic valve to enter an adhesion column to process adhesion; flowing said total solution sequentially pushed by nitrogen gas from the adhesion column through an eighth electromagnetic valve and a seventh electromagnetic valve to enter a second buffer tube; flowing waste nitrogen gas from the second buffer tube through a fifth electromagnetic valve and a third electromagnetic valve to be discharged; and staying said total solution in said second buffer tube;

(b) backwashing by: flowing nitrogen gas through said second electromagnetic valve, said third electromagnetic valve and said fifth electromagnetic valve to push out said total solution sequentially pushed by nitrogen gas in said second buffer tube; flowing said total solution sequentially pushed by nitrogen gas through said seventh electromagnetic valve and said eighth electromagnetic valve to enter said adhesion column to process adhesion; flowing said total solution sequentially pushed by nitrogen gas through said sixth electromagnetic valve to enter said first buffer tube; and flowing waste nitrogen gas from the first buffer tube through said fourth electromagnetic valve and said first electromagnetic valve to be discharged;

(c) discharging reaction solution by: flowing nitrogen gas through said second electromagnetic valve, said first electromagnetic valve and said fourth electromagnetic valve to push out said total solution sequentially pushed by nitrogen gas stayed in said first buffer tube; flowing said total solution through said sixth electromagnetic valve, the adhesion column, said eighth electromagnetic valve and a ninth electromagnetic valve to be discharged;

(d) backwashing by: flowing a cleaning fluid sequentially through said second electromagnetic valve, said third electromagnetic valve and said fifth electromagnetic valve to enter a fourth buffer tube; sequentially flowing said cleaning fluid through said seventh electromagnetic valve and said eighth electromagnetic valve to enter said adhesion column to wash out impurities; sequentially flowing said cleaning fluid through said sixth electromagnetic valve to enter a third buffer tube; and sequentially flowing said cleaning fluid through said fourth electromagnetic valve and said first electromagnetic valve to be discharged;

(e) washing by: sequentially flowing a cleaning fluid through said second electromagnetic valve, said first electromagnetic valve and said fourth electromagnetic valve to enter said third buffer tube; sequentially flowing said cleaning fluid through said sixth electromagnetic valve to enter said adhesion column to wash out impurities; and sequentially flowing said cleaning fluid through said eighth electromagnetic valve and said ninth electromagnetic valve to be discharged; and (f) eluting out product by: sequentially flowing an eluting fluid through said second electromagnetic valve, said first electromagnetic valve and said fourth electromagnetic valve to enter said third buffer tube; sequentially flowing said eluting fluid through said sixth electromagnetic valve to enter said adhesion column to elute out a product; and sequentially flowing said product through said eighth electromagnetic valve and said ninth electromagnetic valve to be flown out.

2. The method according to claim 1, wherein said first to said ninth electromagnetic valves are three-way electromagnetic valves.

3. The method according to claim 1, wherein said first and said second buffer tubes have diameters and volumes bigger than said third and said fourth buffer tubes.

* * * * *